(12) United States Patent
Schauder et al.

(10) Patent No.: US 7,439,307 B2
(45) Date of Patent: *Oct. 21, 2008

(54) ARTICLES MADE FROM GRAFT-MODIFIED POLYMERS BASED ON NOVEL PROPYLENE ETHYLENE COPOLYMERS

(75) Inventors: Jean-Roch H. Schauder, Wavre (BE); Sudhin Datta, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 19 days.

This patent is subject to a terminal disclaimer.

(21) Appl. No.: 11/075,353

(22) Filed: Mar. 8, 2005

(65) Prior Publication Data

US 2005/0176888 A1  Aug. 11, 2005

Related U.S. Application Data

(62) Division of application No. 10/415,608, filed as application No. PCT/US01/32300 on Oct. 17, 2001, now Pat. No. 6,884,850.

(60) Provisional application No. 60/244,383, filed on Oct. 30, 2000.

(51) Int. Cl.
*C08F 255/02* (2006.01)
*C08L 51/06* (2006.01)

(52) U.S. Cl. .................. 525/285; 525/69; 525/207; 525/221; 525/240

(58) Field of Classification Search ................. 525/285, 525/207, 221, 240, 69
See application file for complete search history.

(56) References Cited

U.S. PATENT DOCUMENTS

| | | | |
|---|---|---|---|
| 3,416,990 A | 12/1968 | Robinson, Jr. | 161/93 |
| 3,862,265 A | 1/1975 | Steinkamp et al. | 260/878 R |
| 4,159,287 A | 6/1979 | Ames | 260/878 R |
| 4,780,228 A | 10/1988 | Gardiner et al. | 252/51 |
| 4,999,403 A * | 3/1991 | Datta et al. | 525/322 |
| 5,047,462 A | 9/1991 | Kehr et al. | 524/423 |
| 5,059,658 A | 10/1991 | Sezume et al. | 525/263 |
| 5,367,022 A | 11/1994 | Kiang et al. | 525/74 |
| 5,424,367 A | 6/1995 | Auda et al. | 525/285 |
| 5,439,974 A | 8/1995 | Mattson | 525/74 |
| 5,451,639 A | 9/1995 | Marczinke et al. | 525/193 |
| 5,504,172 A | 4/1996 | Imuta et al. | 526/351 |
| 5,670,595 A | 9/1997 | Meka et al. | 526/336 |
| 5,763,088 A | 6/1998 | Nakano et al. | 428/424.8 |
| 5,998,039 A | 12/1999 | Tanizaki et al. | 428/516 |
| 6,002,064 A | 12/1999 | Kobylivker et al. | 604/367 |
| 6,288,171 B2 | 9/2001 | Finerman et al. | 525/192 |
| 6,884,850 B2 | 4/2005 | Schauder et al. | 525/285 |
| 6,921,794 B2 | 7/2005 | Cozewith et al. | 525/240 |
| 2005/0075441 A1 | 4/2005 | Onoe et al. | 524/474 |
| 2006/0211825 A1 | 9/2006 | Schauder et al. | 525/285 |

FOREIGN PATENT DOCUMENTS

| | | |
|---|---|---|
| EP | 0 767 182 | 4/1997 |
| EP | 0 770 641 | 5/1997 |
| EP | 0 777 693 | 6/1997 |
| EP | 0 964 011 | 12/1999 |
| GB | 879 195 | 10/1961 |
| GB | 1 040 539 | 8/1966 |
| GB | 1 531 188 | 11/1978 |
| GB | 2 022 597 | 12/1979 |
| GB | 1 578 049 | 10/1980 |
| WO | WO02/36651 | 5/2002 |
| WO | WO2005/049670 | 6/2005 |

OTHER PUBLICATIONS

*Modification of Polypropylene with Maleic Anhydride*, Hogt, ANTEC '88 Proceedings of the 46th Annual Technical Conference, Atlanta, Apr. 18-21, 1988, p. 1478-1480.
*The Maleic Anhydride Grafting of Polypropylene with Organic Peroxides*, Callais et al., ANTEC '90 Plastics in the Environment: Yesterday, Today and Tomorrow, Conference Proceedings, Dallas TX, May 7-11, 1990, pp. 1921-1923.
M. Lambla in Makromol. Chem., Macromol. Symp. 75, entitled "Exchange and Free Radical Grafting Reactions in Reactive Extrusion", pp. 137-157, 1993.
W. Heinen et al., Macromolecules, 29, entitled "$^{13}$C NMR Study of the Grafting of Maleic Anhydride onto Polyethene, Polypropene, and Ethene—Propene Copolymers", p. 1151-1157, Netherlands, 1996.
Braun et al., Macromol. Symp. 129, entitled "Chemical Modification of Polymeric Hydrocarbons", pp. 43-51 (1998) Germany.
Heinen* et al., Macromol. Symp. 129, entitled $^{13}$C NMR Study of the Grafting of $^{13}$C Labeled Maleic Anhydride onto PE, PP and EPM, pp. 119-125, The Netherlands.
S.B. Brown, in Reactive Extrusion, Chapter 4, entitled "Reactive Extrusion: A Survey of Chemical Reactions of Monomers and Polymers during Extrusion Processing" Polymer Processing Institute, pp. 75-199, New York, 1992.
Hu, Flat, and Lambla, Reactive Modifiers for Polymers, Blackie Academic & Professional, entitled "Free-Radical Grafting of Monomers onto Polymers by Reactive Extrusion: Principles and Applications", pp. 1-83, 1997.
Gaylord et al., Journal of Polymer Science: Polymer Letters Edition, Entitled "Nondegradative Reaction of Maleic Anhydride and Molten Polypropylene in the Presence of Peroxides" V21, pp. 23-30 (1983), New Jersey.
K. E. Russel et al., Journal of Polymer Science: Part A: Polymer Chemistry, entitled "Grafting of Maleic Anhydride to *n*-Eicosane", Ontario, Canada, vol. 26, pp. 2273-2280 (1988).

* cited by examiner

*Primary Examiner*—Randy Gulakowski
*Assistant Examiner*—Olga Asinovsky

(57) ABSTRACT

Articles made from propylene ethylene copolymers with an ethylene content between 8 and 32 mole % have been grafted with maleic anhydride and a peroxide. The functionality level is higher than what is reported with polypropylene.

16 Claims, 2 Drawing Sheets

Effect of Ethylene Content on Grafting Level

ARTICLES MADE FROM GRAFT-MODIFIED POLYMERS BASED ON NOVEL PROPYLENE ETHYLENE COPOLYMERS

CROSS REFERENCE TO RELATED APPLICATIONS

This application is a divisional application of Ser. No. 10/415,608, filed Oct. 27, 2003, now U.S. Pat. No. 6,884,850, which is a National Stage Application of International Application No. PCT/US01/32300, filed Oct. 17, 2001, which claims the benefit of Provisional Application No. 60/244,383, filed Oct. 30, 2000, the entire disclosure of which is incorporated herein by reference.

FIELD OF INVENTION

The present invention relates to an article made from a novel graft reaction product of propylene/ethylene copolymers and maleic anhydride. The maleated polymer is grafted in the presence of a peroxide initiator.

BACKGROUND ART

Polypropylene-based graft copolymers are useful as compatibilizers for a variety of polymer blends containing polypropylene. These blends include those where the composition is entirely composed of polyolefins and those where an inorganic filler such as clays or glass fiber is also present. In particular, these inventions are directed to the formation of these graft polymers to form propylene rich components that contain isotactic polypropylene crystallinity. These elastic polymers may be used as blend components as well as adhesion promoters between polyolefins and substrates such as glass, metal and engineering plastics such as polyamides. It is however acknowledged that these grafted polyolefins, particularly those that have a predominance of propylene in their composition and have most of the propylene in predominantly isotactic configuration have poor elastic properties.

Graft reactions of polyolefins consisting largely of polypropylene is known via solution reactions, gas phase surface modification. However, the most common processes involve melt processing procedures such as single or multiple screw extruders, rubber masticators, Banbury processors, Brabender processors, roll-mills and the like, include well-known technology and are widely reported in the technical literature. Similarly, post-graft reactions with the graft polymers are also widely reported in all of the media and procedures shown above. Thus, the graft reaction of unsaturated carboxylic acid or carboxylic acid derivatives with thermoplastic polymers or low molecular weight chemicals capable of subsequent chemical reaction for use in such as lubricating oil compositions or thermoplastic blend compositions has become an important field of ongoing development.

Polypropylene grafting with unsaturated monomers including maleic anhydride is well documented in the literature (see S. B Brown, in *Reactive Extrusion*, Chapter 4, Polymer Processing Institute, 1992). U.S. Pat. No. 5,439,974 addresses adhesive blends suitable for adhesion to one or more polypropylene substrates consisting essentially of a mixture of an impact copolymer and a graft reaction product of a propylene polymer and a carboxylic acid or derivative thereof. The polymeric backbone which is grafted is an impact copolymer defined as a mixture of polypropylene and ethylene/propylene copolymer. The impact copolymers in U.S. Pat. No. 5,439,974 are mixtures prepared by a multistage polymerization process and are usually identified as reactors TPOs or heterophasis polypropylene (column 3, line 61 to column 4, line 7).

U.S. Pat. No. 5,451,639 addresses propylene copolymers grafted with ethylenically unsaturated carboxylic acids or carboxylic acid derivatives and consisting of a random copolymer containing from 0.1 to 15 weight % of copolymerized $C_2$ or $C_4$ to $C_{10}$ 1-alkenes. Further examples of the grafting of unsaturated carbonyl compounds to polypropylene and copolymers containing very large amounts of propylene are shown in the following publications that are fully incorporated by reference. In *Modification of Polypropylene with Maleic Anhydride*, Hogt, ANTEC '88 Proceedings of the 46th Annual Technical Conference, Atlanta, 18-21 Apr. 1988, p. 1478-80, *Maleic Anhydride Grafting of Polypropylene with Organic Peroxides*, and Callais et al, ANTEC '90 Plastics in the Environment: Yesterday, Today and Tomorrow, Conference Proceedings, Dallas Tex., 7th-11th May 1990, p. 1921-3, *Carbon 13 NMR Study of the Grafting of Maleic Anhydride onto Polyethylene, Polypropylene, and Ethene-Propene Copolymers*, the maleation of isotactic polypropylene homopolymers is taught.

As shown in the literature above, the functionalization of polyolefins which contain predominantly large amounts of propylene and contain isotactic crystallinity is of importance. However, none of these publications address the formation of a essentially propylene copolymer with most of the propylene in isotactic configuration which is grafted with maleic anhydride or other similar unsaturated carbonyl compound which is elastic, soft and has very low levels of crystallinity.

In addition, U.S. Pat. No. 3,862,265 addresses degradation in molecular weight to achieve narrow molecular weight distribution, and optional free-radical initiated graft reaction of unsaturated monomers with, for example, ethylene-propylene copolymer by use of melt processing procedures in an extruder reactor. Intensive mixing of free radical initiator and graft reactants with molten polymers is achieved by the use of either decompression zones or thin film zones in the extruder. For additional background, see also EP 0 770 641 A; GB 1 040 539 A; GB 879 195 A; EP 0 767 182 A; GB 1 531 188 A; GB 1 578 049 A; U.S. Pat. No. 4,780,228 A; GB 2 022 597 A; U.S. Pat. No. 4,159,287 A; EP 0 964 011 A; U.S. Pat. No. 3,416,990 A; and U.S. Pat. No. 5,504,172.

SUMMARY OF THE INVENTION

Article made from maleated graft polymer comprising a polymer component, said polymer component comprising a random copolymer produced by copolymerizing propylene and a comonomer selected from ethylene or other alpha-olefin having 4 to 6 carbon atoms. The copolymer preferably has a crystallinity of from about 0.1 to about 50%, more preferably from about 0.2 to about 25%, and most preferably from about 0.5 to about 15% from isotactic polypropylene sequences, a propylene content of from about 68 to 92 mole %, a comonomer content of from about 8 to 32 mole percent and a melting point of from 25° C. to 105° C. and maleic anhydride. Preferably, the comonomer is ethylene and most preferably the ethylene comonomer is from about 7 to about 33 mole percent. The copolymer has a heat of fusion of less than 45 J/g.

FIGURES

DETAILED DESCRIPTION OF INVENTION

Figure 1:
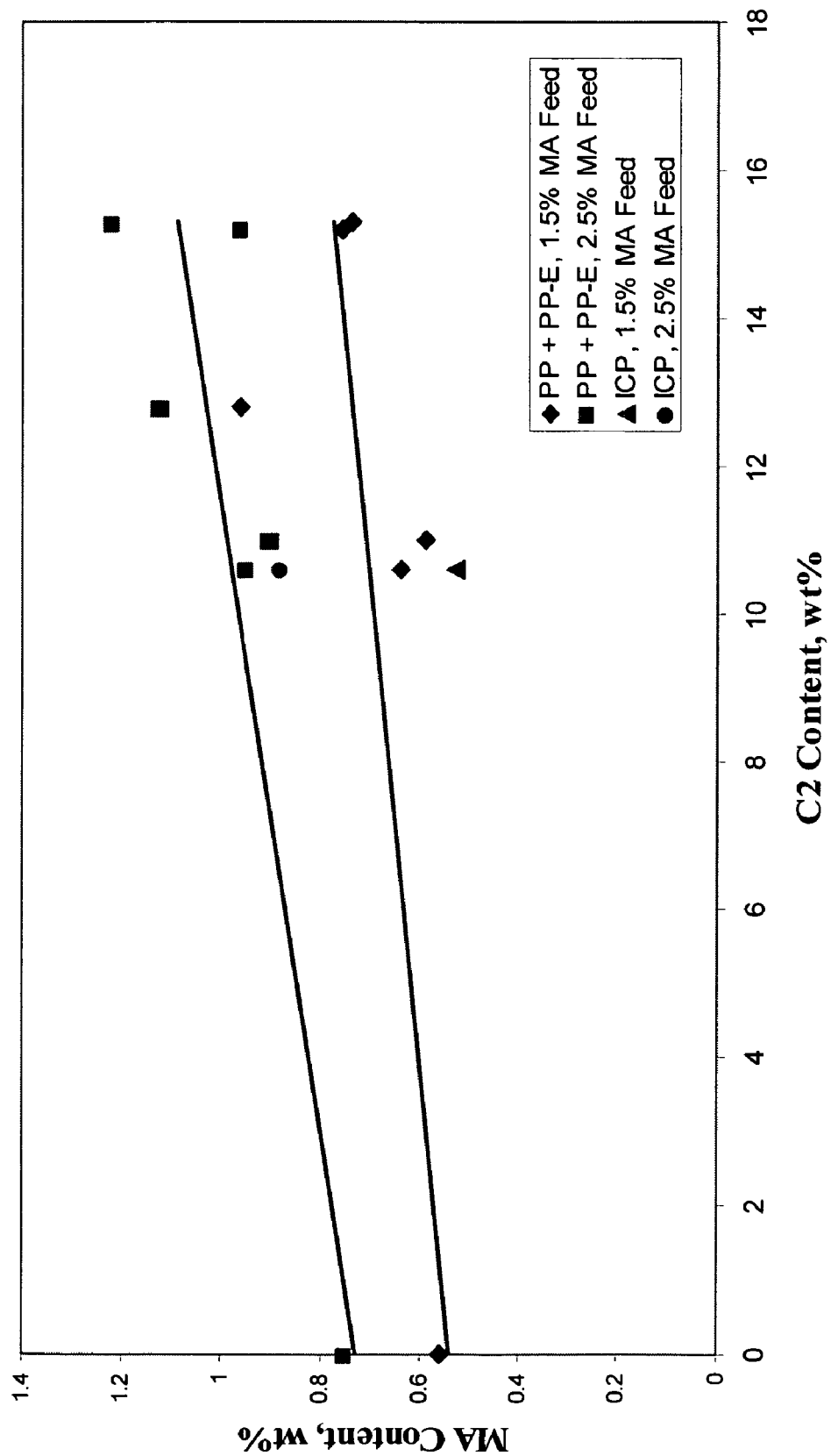
FIG. 1 is a graph illustrating the effect of the ethylene content on the grafting level of the present invention.

For many years, polypropylene (PP) has been functionalized with maleic anhydride to produce maleic anhydride grafted polypropylene, which is used as an adhesion promoter in glass and mineral filled polypropylene compounds as well as compatibilizer of polyamide polypropylene blends. The grafted polypropylene polymers are also used in other applications where adhesion onto metal or polar substrates (including polar polymers) is required. During the grafting process, macroradicals are generated and beta scission usually occurs before the reaction with maleic anhydride takes place. The result is that grafting levels are generally low and the resulting functionalized polypropylene has a low molecular weight. It has also been recognized in prior literature (M. Lambla et al. in *Makromol. Chem., Macromol. Symp.*, 75, 137 (1993) that the grafting yield of maleic anhydride is not a monotonic function of its initial concentration but reaches a maximum before decreasing. The existence of the maximum is associated with a limited solubility of maleic anhydride in the molten polypropylene. It is believed that with increasing the maleic anhydride feed, the polypropylene/maleic anhydride/peroxide mixture changes from a single to a biphasic system with maleic anhydride/polyolefin droplets dispersed in the molten polypropylene.

Propylene ethylene copolymers having a low ethylene content (between 8 and 32 mole %), and with predominantly isotactic polypropylene segments (>80% mm triad by $^{13}$C NMR) insuring polypropylene type crystallinity have been grafted with maleic anhydride. Compared to a polypropylene homopolymer, these polymers, comprising low levels of ethylene content, have a higher grafting level when increasing the maleic anhydride feed. This allows the production of maleic anhydride grafted propylene rich copolymers at levels of at least 1.2 wt %.

The present invention provides the grafting of a novel composition of propylene ethylene copolymers with maleic anhydride in a single stage in the presence of a peroxide initiator. The copolymer starting materials comprise an ethylene content from about 8 to 32 mole %, more preferably from about 10 to about 27 mole % ethylene, and most preferably from about 14 to 21 mole % ethylene. These novel propylene ethylene polymers contain between 92 to 68 mole % of propylene with a predominant (>80%) of the propylene in isotactic configuration as measured by the mm triad in $^{13}$C NMR. These polymers contain a single hydrocarbon phase unlike the polymers of the prior art of the same composition and tacticity (so called reactor TPO or impact copolymers) which typically consist of at least two distinct phases. In addition and more importantly, these polymers are very flexible as determined by their values of flexural modulus to be less than 350 MPa, have high elongations under a unidimensional tensile load of greater than 800% and a level of crystallinity much lower than expected from the prior art for their composition and tacticity of the propylene residues. Polymers of the present invention are made in a polymerization process that comprises a single stage polymerization process.

These novel propylene ethylene copolymers when maleated, exhibit a higher grafting level than one skilled in the art would expect, and comprise isotactic sequences long enough to engender crystallinity. These grafted polymers contain a single hydrocarbon phase unlike the polymers of the prior art of the same composition, grafting level and tacticity (so called grafted reactor copolymers and impact copolymers) which typically consist of at least two distinct phases. In addition and more importantly, these grafted polymers are very flexible as determined by their values of flexural modulus to be less than 350 MPa, have high elongations under a unidimensional tensile load of greater than 800% and a level of crystallinity much lower than expected from the prior art for their composition and tacticity of the propylene residues. The functionality level of the product copolymers is greater than that for similarly grafted propylene homopolymers. The functionality level of the product copolymers increases with the increase in the level of the maleic anhydride feed and can be as much as 1.5 weight %. Furthermore, the higher incorporation of functional groups is accomplished without a lower degree of molecular weight loss as in the case of propylene homopolymers.

Polymer Component

The novel polypropylene copolymers of this embodiment can be prepared by polymerizing propylene with a $C_2$ or $C_4$-$C_{20}$ alpha olefin, most preferably propylene and ethylene in the presence of a chiral metallocene catalyst with an activator and optional scavenger. The comonomer used with propylene may be linear or branched. Preferred linear alpha-olefins include ethylene or $C_4$ to $C_8$ α-olefins, more preferably ethylene, 1-butene, 1-hexene, and 1-octene, even more preferably ethylene or 1-butene. Preferred branched alpha-olefins include 4methyl-1-pentene, 3-methyl-1-pentene, and 3,5,5-trimethyl-1-hexene.

Preferred polypropylene copolymers have an average propylene content on a molar basis of from about 68% to about 92%, more preferably from about 75% to about 91%, even more preferably from about 78% to about 88%, most preferably from about 80% to about 88%, The balance of the copolymer is one or more alpha-olefins as specified above and optionally minor amounts of one or more diene monomers.

Preferably, the polypropylene copolymer comprises ethylene as the comonomer in the range of from about 8 to 32 mole %, more preferably from about 9 to about 25 mole % ethylene, even more preferably from about 12 to about 22 mole % ethylene and most preferably from about 13 to 20 mole % ethylene.

The use of a chiral metallocene catalyst ensures that the methyl group of the propylene residues have predominantly the same tacticity. Both syndiotactic and isotactic configuration of the propylene are possible though the isotactic polymers are preferred. The tacticity of the propylene residues leads to crystallinity in the polymers. For the polymers of the present invention the low levels of crystallinity in the polypropylene copolymer are derived from isotactic polypropylene obtained by incorporating alpha-olefin comonomers as described above. The semi-crystalline polypropylene copolymer preferably has a heat of fusion from about 0.5 J/g to about 25 J/g, more preferably from about 1 J/g to about 20 J/g, and most preferably from about 1 J/g to about 15 J/g. The crystallinity of the polypropylene copolymer arises predominantly from crystallizable stereoregular propylene sequences. The crystallinity of the polypropylene copolymer can also be expressed in terms of percentage of crystallinity. The thermal energy for the highest order of polypropylene is estimated at 189 J/g. That is, 100% crystallinity is equal to 189 J/g. Therefore, according to the aforementioned heat of fusion values, the present invention preferably has a polypropylene crystallinity of about 0.25% to about 15%, more preferably from about 0.5% to about 13%, and most preferably from about 0.5% to about 11%.

The polypropylene copolymer preferably has a single broad melting transition. Typically a sample of the polypropylene copolymer will show secondary melting peaks adjacent to the principal peak, these are considered together as a single melting point. The highest of these peaks is considered the melting point. The polypropylene copolymer preferably has a melting point of from about 25° C. to about 75° C., preferably in the range of from about 25° C. to about 65° C., more preferably in the range of from about 30° C. to about 60° C.

The weight average molecular weight of the polypropylene copolymer can be between 10,000 to 5,000,000 g/cc, preferably 80,000 to 500,000 with a MWD ($M_w/M_n$) between 1.5 to 40.0, more preferably between about 1.8 to 5 and most preferably between 1.8 to 3. In another embodiment, it is preferred if the polypropylene copolymer has a Mooney viscosity ML (1+4)@125° C. less than 100, more preferably less than 75, even more preferably less than 60, most preferably less than 30.

The polypropylene copolymer of the present invention preferably comprises a random crystallizable copolymer having a narrow compositional distribution. The intermolecular composition distribution of the polymer is determined by thermal fractionation in a solvent. A typical solvent is a saturated hydrocarbon such as hexane or heptane. This thermal fractionation procedure is described below. Typically, approximately 75% by weight and more preferably 85% by weight of the polymer is isolated as one or two adjacent, soluble fraction with the balance of the polymer in immediately preceding or succeeding fractions. Each of these fractions has a composition (wt. % ethylene content) with a difference of no greater than 20% (relative) and more preferably 10% (relative) of the average weight % ethylene content of the polypropylene copolymer. The polypropylene copolymer has a narrow compositional distribution if it meets the fractionation test criteria outlined above.

The length and distribution of stereoregular propylene sequences in preferred polypropylene copolymers is consistent with substantially random statistical copolymerization. It is well known that sequence length and distribution are related to the copolymerization reactivity ratios. By substantially random, we mean copolymer for which the product of the reactivity ratios is generally 2 or less. In stereoblock structures, the average length of polypropylene sequences is greater than that of substantially random copolymers with a similar composition. Prior art polymers with stereoblock structure have a distribution of polypropylene sequences consistent with these blocky structures rather than a random substantially statistical distribution. The reactivity ratios and sequence distribution of the polymer may be determined by $^{13}$CNMR, as is discussed in detail below, which locates the ethylene residues in relation to the neighboring propylene residues. To produce a crystallizable copolymer with the required randomness and narrow composition distribution, it is desirable to use (1) a single sited catalyst and (2) a well-mixed, continuous flow stirred tank polymerization reactor which allows only a single polymerization environment for substantially all of the polymer chains of preferred polypropylene copolymers.

Preferred polypropylene copolymers of this embodiment are prepared by polymerizing propylene and at least one $C_2$ or $C_4$-$C_{20}$ alpha olefin in the presence of a chiral metallocene catalyst with an activator and optional scavenger, most preferably ethylene and propylene. Preferred chiral metallocenes are those known to favor incorporation of propylene for the production of predominantly isotactic polypropylene pentads and statistically random incorporation of the α-olefin comonomer(s). The term "metallocene" and "metallocene catalyst precursor" are terms known in the art to mean compounds possessing a Group IV, V, or VI transition metal M, with a cyclopentadienyl (Cp) ligand or ligands which may be may be substituted, at least one non-cyclopentadienyl-derived ligand X, and zero or one heteroatom-containing ligand Y, the ligands being coordinated to M and corresponding in number to the valence thereof. The metallocene catalyst precursors generally require activation with a suitable co-catalyst (referred to as activator) in order to yield an active metallocene catalyst which refers generally to an organometallic complex with a vacant coordination site that can coordinate, insert, and polymerize olefins.

Preferable metallocenes are cyclopentadienyl (Cp) complexes which have two Cp ring systems for ligands. The Cp ligands preferably form a bent sandwich complex with the metal and are preferably locked into a rigid configuration through a bridging group. These cyclopentadienyl complexes have the general formula:

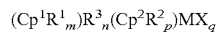

Wherein $Cp^1$ of ligand $(Cp^1R^1_m)$ and $Cp^2$ of ligand $(Cp^2R^2_p)$ are preferably the same, $R^1$ and $R^2$ each is, independently, a halogen or a hydrocarbyl, halocarbyl, hydrocarbyl-substituted organometalloid or halocarbyl-substituted organometalloid group containing up to 20 carbon atoms, m is preferably 1 to 5, p is preferably 1 to 5, and preferably two $R^1$ and/or $R^2$ substituents on adjacent carbon atoms of the cyclopentadienyl ring associated there which can be joined together to form a ring containing from 4 to 20 carbon atoms, $R^3$ is a bridging group, n is the number of atoms in the direct chain between the two ligands and is preferably 1 to 8, most preferably 1 to 3, M is a transition metal having a valence of from 3 to 6, preferably from group 4, 5, or 6 of the periodic table of the elements and is preferably in its highest oxidation state, each X is a non-cyclopentadienyl ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to 20 carbon atoms, q is equal to the valence of M minus 2.

Numerous examples of the biscyclopentadienyl metallocenes described above for the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614, all of which are incorporated by reference for purposes of U.S. patent practice.

Illustrative, but not limiting examples of preferred biscyclopentadienyl metallocenes of the type described in group 1 above for the invention are the racemic isomers of:

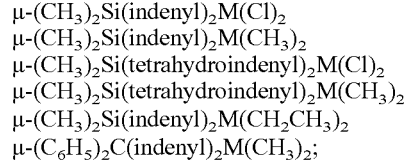

wherein M is chosen from a group consisting of Zr, Hf, or Ti.

A preferred polypropylene copolymer used in the present invention is described in detail as the "Second Polymer Component (SPC)" in co-pending U.S. applications U.S. Ser. No. 60/133,966, filed May 13, 1999, and U.S. Ser. No. 60/342,854, filed Jun. 29, 1999, and described in further detail as the "Propylene Olefin Copolymer" in U.S. Ser. No. 90/346,460, filed Jul. 1, 1999, which are both fully incorporated by reference herein for purposes of U.S. practice.

In addition to one or more comonomers making up the major portion of the polymer (i.e., alpha-olefins) selected such as, but not limited to, ethylene, alpha-olefins having 4 to 8 carbon atoms, and styrenes, the polypropylene copolymers, as described above can optionally contain long chain branches. These can optionally be generated using one or more α, ω dienes. Alternatively, the soft polymer component may contain small quantities of at least one diene, and more preferably at least one of the dienes is a non-conjugated diene to aid in the vulcanization and other chemical modification. The amount of diene is preferably no greater than about 10 wt %, more preferably no greater than about 5 wt %. The diene may be selected from the group consisting of those that are used for the vulcanization of ethylene propylene rubbers and preferably ethylidene norbornene, vinyl norbornene, dicyclopentadiene, and 1,4-hexadiene (available from DuPont Chemicals).

In another embodiment, the polymer component can be a blend of discrete polymers. Such blends can be of two or more polyethylene copolymers (as described above), two or more polypropylene copolymers (as described above), or at least one of each such polyethylene copolymer and polypropylene copolymer, where each of the components of the polymer blend would individually qualify as a polymer component.

It is understood in the context of the present invention that, in one embodiment, more than one polymer component may be used in a single blend. Each of the polymer components is described above and the number of polymer components in this embodiment is less than three and more preferably, two. In this embodiment of the invention the polymer components differ in the alpha-olefin content with one being in the range of 7 to 13 mole % olefin while the other is in the range of 14 to 22 mole % olefin. The preferred olefin is ethylene. It is believed that the use of two-polymer components leads to beneficial improvements in the tensile-elongation properties of the blends Propylene ethylene copolymers of this invention differ in their structure from any existing commercially available polypropylene copolymers. The propylene ethylene copolymers from this invention have unique properties as evidenced by the relationship of their isotactic index and propylene triad tacticity to their ethylene content. A detailed discussion of isotactic index and triad tacticity can be found in 98B038, which is incorporated by reference for purposes of U.S. patent practice.

Two types of polypropylene copolymers are today available on the market: random copolymers (RCP) and impact copolymers (ICP) also called heterophasic copolymers or block copolymers. RCPs are usually produced by copolymerizing in a single reactor process propylene with other monomers such as ethylene, butene and higher alpha-olefins, the most common one being ethylene. Typical ethylene content for these copolymers range from 3-4 mole % up to 14-17 mole %. As ethylene content increases, melting point and stiffness decreases. Typical melting temperatures are ranging from 120° C. to 150° C. and flexural modulus have values between 500 and 1500 MPa. ICPs are sequentially produced in processes involving series reactors with an isotactic polypropylene being produced in the first reactor and ethylene being fed to the second reactor to generate an ethylene propylene rubber. Typical ethylene propylene rubber content ranges from 20% to 50% and even up to 70% when Catalloy technology developed by Himont is used. At these high rubber contents, one talks about high alloy copolymers. In the case of these ICPs, the melting point is still around 160° C. as they still contain an isotactic polypropylene fraction. The flexural modulus is typically between 800 and 1300 MPa. The high alloy copolymers have flexural modulus comprised between 90 and 500 MPa.

Copolymers of this invention can be blended with processing oil and other common additives such as nucleating agents, antioxidants, fillers, etc. and fabricated into objects used in a variety of applications mentioned above.

Also, blends comprising the copolymers of this invention and other alpha-olefin polymers and copolymers, e.g., polypropylene are fabricated into objects used in a variety of applications mentioned above. Generally, these blends contain processing oil and other common additives such as nucleating agents, antioxidants, fillers, etc.

Isotactic index and triad tacticity were determined for this invention's propylene ethylene copolymers in the manner described below.

Triad Tacticity

The term "tacticity" refers to the stereogenicity in a polymer. For example, the chirality of adjacent monomers can be of either like or opposite configuration. The term "diad" is used to designate two contiguous monomers; three adjacent monomers are called a triad. If the chirality of adjacent monomers is of the same relative configuration, the diad is called isotactic; if opposite in configuration, it is termed syndiotactic. Another way to describe the configurational relationship is to term contiguous pairs of monomers having the same chirality as meso (m) and those of opposite configuration racemic (r).

When three adjacent monomers are of the same configuration, the stereoregularity of the triad is 'mm'. If two adjacent monomers in a three-monomer sequence have the same chirality and that is different from the relative configuration of the third unit, this triad has 'mr' tacticity. An 'rr' triad has the middle monomer unit having an opposite configuration from either neighbor. The fraction of each type of triad in the polymer can be determined and when multiplied by 100 indicates the percentage of that type found in the polymer.

As indicated supra, the reactivity ratios and sequence distribution of the polymer may be determined by C-13 NMR, which locates the ethylene residues in relation to the neighboring propylene residues.

The triad tacticity can be determined from a $^{13}$C-NMR spectrum of the propylene copolymer. The $^{13}$C-NMR spectrum is measured in the following manner. To measure the $^{13}$C-NMR spectrum, 250-350 mg of polymer is completely dissolved in deuterated tetrachloroethane in a NMR sample tube (diameter: 10 mm) at 120° C. The measurement is conducted with full proton decoupling using a 90° pulse angle and at least a 15 second delay between pulses.

With respect to measuring the chemical shifts of the resonances, the methyl group of the third unit in a sequence of 5 contiguous propylene units consisting of head-to-tail bonds and having the same relative chirality is set to 21.83 ppm. The chemical shift of other carbon resonances are determined by using the above-mentioned value as a reference. The spectrum relating to the methyl carbon region (17.0-23 ppm) can be classified into the first region (21.1-21.9 ppm), the second region (20.4-21.0 ppm), the third region (19.5-20.4 ppm) and the fourth region (17.0-17.5 ppm). Each peak in the spectrum was assigned with reference to literature source such as the articles in, "Polymer", 30 (1989) 1350 or "Macromolecules", 17 (1984) 1950 which are fully incorporated by reference.

In the first region, the signal of the center methyl group in a PPP (mm) triad is located.

In the second region, the signal of the center methyl group in a PPP (mr) triad and the methyl group of a propylene unit whose adjacent units are a propylene unit and an ethylene unit resonates (PPE-methyl group).

In the third region, the signal of the center methyl group in a PPP (rr) triad and the methyl group of a propylene unit whose adjacent units are ethylene units resonate (EPE-methyl group).

PPP (mm), PPP (mr) and PPP (rr) have the following three-propylene units-chain structure with head-to-tail bonds, respectively. This is shown in the Fischer projection diagrams below.

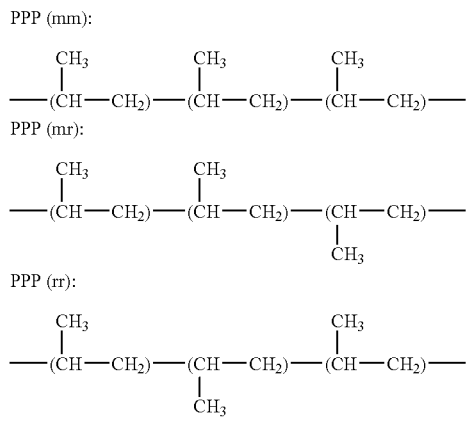

The triad tacticity (mm fraction) of the propylene copolymer can be determined from a $^{13}$C-NMR spectrum of the propylene copolymer and the following formula:

$$\text{mm Fraction} = \frac{PPP \text{ (mm)}}{PPP \text{ (mm)} + PPP(mr) + PPP(rr)}$$

The peak areas used in the above calculation are not measured directly from the triad regions in the $^{13}$C-NMR spectrum. The intensities of the mr and rr triad regions need to have subtracted from them the areas due to EPP and EPE sequencing, respectively. The EPP area can be determined from the signal at 30.8 ppm after subtracting from it one half the area of the sum of the signals between 26 and 27.2 ppm and the signal at 30.1 ppm. The area due to EPE can be determined from the signal at 33.2 ppm.

In addition to the above adjustments to the mr and rr regions for the presence of EPP and EPE, other adjustments need to be made to these regions prior to using the above formula. These adjustments are needed to account for signals present due to non-head-to-tail propylene additions. The area of the mr region may be adjusted by subtracting one half of the area between 34 and 36 ppm and the area of the rr region may be adjusted by subtracting the intensity found between 33.7 and 40.0 ppm. Therefore, by making the above adjustments to the mr and rr regions the signal intensities of the mm, mr and rr triads can be determined and the above formula applied.

The propylene ethylene copolymers made by this invention have unique propylene tacticity as measured by % meso triad. As shown in detail in U.S. Ser. No. 09/108,772, filed Jul. 1, 1998, fully incorporated herein by reference, the copolymers of this invention have a lower % meso triad for any given ethylene content when compared to U.S. Pat. No. 5,504,172. The lower content of % meso triads corresponds to relatively lower crystallinity that translates into better elastomeric properties such as high tensile strength and elongation at break coupled with very good elastic recovery. Good elastomeric properties are important for some of the potential applications mentioned on page 1.

The Grafting Monomer

The grafting monomer is at least one ethylenically unsaturated carboxylic acid or acid derivative, such as an acid anhydride, ester, salt, amide, imide, or the like. Such monomers include but are not necessary limited to the following: acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and x-methylbicyclo(2.2.1)hept-5-ene-2,3-dicarboxylic acid anhydride (XMNA).

Maleic anhydride is a preferred grafting monomer. As used herein, the term "grafting" denotes covalent bonding of the grafting monomer to a polymer chain of the polymeric composition.

In a preferred grafted product of a statistical propylene ethylene copolymer-containing polymeric composition and a maleic anhydride grafting monomer, the grafted maleic anhydride concentration is generally in the range of about 1 to about 6 wt. %, preferably at least about 0.5 wt. % and highly preferably about 1.5 wt. %. The MFR of the grafted product is about 25 g/10 min (at 190° C., 0.352 g) or less, more preferably 20 or less, most preferably below 15 g/10 min.

Preparing Grafted Polymeric Products

The grafted polymeric products may be prepared in solution, in a fluidized bed reactor, or by melt grafting as desired. A particularly preferred grafted product may be conveniently prepared by melt blending the ungrafted polymeric composition, in the substantial absence of a solvent, with a free radical generating catalyst, such as a peroxide catalyst, in the presence of the grafting monomer in a shear-imparting reactor, such as an extruder reactor. Single screw but preferably twin screw extruder reactors such as co-rotating intermeshing extruder or counter-rotating non-intermeshing extruders but also co-kneaders such as those sold by Buss are especially preferred.

The preferred sequence of events used for the grafting reaction consists of melting the polymeric composition, adding and dispersing the grafting monomer, introducing the peroxide and venting the unreacted monomer and by-products resulting from the peroxide decomposition. Other sequences may include feeding the monomers and the peroxide pre-dissolved in a solvent. The monomer is typically introduced to the reactor at a rate of about 0.01 to about 10 wt. % of the total of the polymeric composition and monomer, and preferably at about 1 to about 5 wt. % based on the total reaction mixture weight.

The grafting reaction is carried at a temperature selected to minimize or avoid rapid vaporization and consequent losses of the catalyst and monomer and to have residence times about 6 to 7 times the half life time of the peroxide. A temperature profile where the temperature of the polymer melt increases gradually through the length of the reactor up to a maximum in the grafting reaction zone of the reactor, and then decreases toward the reactor output is preferred. Temperature attenuation in the last sections of the extruder is desirable for product pelletizing purposes.

In order to optimize the consistency of feeding, the peroxide is usually dissolved at an approximate 10% concentration in a mineral oil whereas the polymer and the grafting monomer are fed neat. Specific examples of useful catalysts include: Diacyl peroxides such as benzoyl peroxide; Peroxyesters such as tert-Butyl peroxy benzoate, tert-Butylperoxy acetate, OO-tert-Butyl-O-(2-ethylhexyl)monoperoxy carbonate; Peroxyketals such as n-Butyl 4,4-di-(tert-Butyl peroxy) valerate; and Dialkyl peroxides such as 1,1-bis(tert-butylperoxy)cyclohexane, 1,1-bis(tert-butylperoxy)-3,3,5-trimethylcyclohexane, 2,2-bis(tert-butylperoxy)butane, dicumylperoxide, tert-butylcumylperoxide, a,a'-bis(tert-butylperoxy-isopropyl)benzene, di-tert-butylperoxide (DTBP), 2,5-dimethyl-2,5-di(tert-butylperoxy)-hexane, 2,5-dimethyl-2,5-di(tert-butylperoxy)-hexane; and the like.

Properties of Grafted Polymeric Products

MFR (Melt Flow Rate) of the grafted and ungrafted material was measured according to ASTM D1238 at 230° C. or 190° C.

Mooney viscosity of the grafted and ungrafted material was measured according to ASTM D1646, [ML(1+4), 125° C.].

Ethylene content of the copolymers of the present invention, either grafted or ungrafted was measured according to the following technique. A thin homogeneous film of polymer, pressed at temperature about or greater than 150° C. was mounted on a Perkin Elmer PE 1760 infra red spectrophotometer. A full spectrum of the sample 600 cm$^{-1}$ to 4000 cm$^1$ was recorded and the ethylene content in wt % was calculated according to the equation 1.

$$\text{Ethylene, wt \%} = 82.585 - 111.987\,X + 30.045\,X^2 \quad \text{(eq 1)}$$

where X is the ratio of the peak height at 1155 cm$^{-1}$ and peak height either at 722 cm$^{-1}$ or 732 cm$^{-1}$, whichever is higher.

The composition of the propylene ethylene copolymers, which are used as comparative examples, was measured as ethylene wt % according to ASTM D 3900.

The maleic anhydride content of the grafted polymers was determined according to following procedure. A sample of grafted polymer is first purified from residual monomer by complete solubilization in xylene followed by re-precipitation in acetone. This precipitated polymer is then dried.

0.5 to 1 gram of re-precipitated polymer is dissolved in 150 ml of xylene and a few drops of water are added. The solution is heated at xylene reflux for 1 h and a few drops of a 1% thymol blue solution in DMF are added. The solution is titrated with an excess of 0.025 N potassium hydroxide in ethanol (color change from yellow to blue). The potassium hydroxide excess is than back-titrated with a 0.05 N solution of hydrochloric acid in isopropanol until color changes from blue to yellow. The amount of the potassium hydroxide solution used to neutralize the diacid during the titration is directly proportional to the amount of the graft maleic anhydride present in the polymer.

Techniques for determining the molecular weight ($M_n$ and $M_w$) and molecular weight distribution (MWD) are found in U.S. Pat. No. 4,540,753 (Cozewith, Ju and Verstrate) (which is incorporated by reference herein for purposes of U.S. practices) and references cited therein and in *Macromolecules*, 1988, volume 21, p 3360 (Verstrate et al) (which is herein incorporated by reference for purposes of U.S. practice) and references cited therein.

The procedure for Differential Scanning Calorimetry is described as follows. About 6 to 10 mg of a sheet of the polymer pressed at approximately 200° C. to 230° C. is removed with a punch die. This is annealed at room temperature for 240 hours. At the end of this period, the sample is placed in a Differential Scanning Calorimeter (Perkin Elmer 7 Series Thermal Analysis System) and cooled to about −50° C. to about −70° C. The sample is heated at 20° C./min to attain a final temperature of about 200° C. to about 220° C. The thermal output, recorded as the area under the melting peak of the sample which is typically peaked at about 30° C. to about 175° C. and occurs between the temperatures of about 0° C. and about 200° C. is a measure of the heat of fusion expressed in Joules per gram of polymer. The melting point is recorded as the temperature of the greatest heat absorption within the range of melting of the sample. Under these conditions, the melting point of the second polymer component and the heat of fusion is lower than the first polymer component as outlined in the description above.

Composition distribution of the second polymer component was measured as described below. About 30 gms of the second polymer component was cut into small cubes about ⅛" on the side. This is introduced into a thick walled glass bottle closed with screw cap along with 50 mg of Irganox™ 1076, an antioxidant commercially available from Ciba-Geigy Corporation. Then, 425 ml of hexane (a principal mixture of normal and iso isomers) is added to the contents of the bottle and the sealed bottle is maintained at about 23° C. for 24 hours. At the end of this period, the solution is decanted and the residue is treated with additional hexane for an additional 24 hours. At the end of this period, the two hexane solutions are combined and evaporated to yield a residue of the polymer soluble at 23° C. To the residue is added sufficient hexane to bring the volume to 425 ml and the bottle is maintained at about 31° C. for 24 hours in a covered circulating water bath. The soluble polymer is decanted and the additional amount of hexane is added for another 24 hours at about 31° C. prior to decanting. In this manner, fractions of the second polymer component soluble at 40° C., 48° C., 55° C. and 62° C. are obtained at temperature increases of approximately 8° C. between stages. Further, increases in temperature to 95° C. can be accommodated, if heptane, instead of hexane, is used as the solvent for all temperatures above about 60° C. The soluble polymers are dried, weighed and analyzed for composition, as wt % ethylene content, by the IR technique described above. Soluble fractions obtained in the adjacent temperature increases are the adjacent fractions in the specification above.

Comparative data was obtained with EPR, which is Vistalon™ 457, sold by the ExxonMobil Chemical Company, Houston, Tex.

Various other techniques were used to characterize the copolymers of this invention some of which are described in "Structure Characterization" The Science and Technology of Elastomers, F. Eirich, editor, Academic Press 1978, Chapter 3 by G. Ver Strate which is incorporated by reference for purposes of U.S. Patent Practice.

The grafted materials of the present invention have tensile elongation in excess of 300%, more preferably in excess of 500% and even more preferably in excess of 800%. This elongation is determined for the compositions at 50 cm/min according to the procedure described in ASTM D790. The data is reported in engineering units with no correction to the stress for the lateral contraction in the specimen due to tensile elongation.

The stress-strain elongation properties of the insitu and the corresponding physical blends were evaluated using dumbbell shaped sample. The samples were compression molded at 180° C. to 200° C. for 15 minutes at a force of 15 tons into a plaque of dimensions of 6 in×6 in. The cooled plaques were removed and the specimens were removed with a die. The stress strain evaluation of the samples was conducted on an Instron™4465, made by Instron Corporation of 100 Royall Street, Canton, Mass. The digital data was collected in a file collected by the Series IX Material Testing System available from Instron Corporation and analysed using Excel 5, a spreadsheet program available from Microsoft Corporation of Redmond, Wash. Comparative compositions having similar levels of isotactic crystallinity (as determined by $^{13}$C-NMR) often cannot be extended to 500% extension for evaluation of the 500% modulus and thus cannot be compared to the compositions of the current invention.

Flexural modulus (secant 1%) was determined according to according to ASTM D790. The benefit of the above invention is that the polymers of this novel composition have a low flexural modulus. Low flexural modulus is a 1% secant modulus less than 1400 MPa, more preferably less than 700 MPa and more preferably less than 350 MPa. Comparative compositions having similar levels of isotactic crystallinity (as determined by $^{13}$C-NMR) often cannot have flexural modulus less than 1400 MPa.

It is possible to generate comparative polymer compositions with some aspect of the combined 500% tensile modulus and the low flexural modulus of the compositions of this invention if polymers are of extremely high molecular weight and in the limit crosslinked. Such a combination of properties would lead to very poor processing characteristics since they would tend to melt fracture. It is understood that these compositions are directed to easy processing materials which can be handled in conventional thermoplastics processing machinery.

EXAMPLE 1

Ethylene & Propylene Copolymerization to Form the Propylene Ethylene Copolymer Continuous polymerization of the propylene ethylene copolymer was conducted in a 9 liter Continuous Flow Stirred Tank Reactor using hexane as the solvent. The liquid full reactor had a residence time of 9 minutes and the pressure was maintained at 700 kpa. A mixed feed of hexane, ethylene and propylene was pre-chilled to approximately −30° C. to remove the heat of polymerization, before entering the reactor. Solution of catalyst/activator in toluene and the scavenger in hexane were separately and continuously admitted into the reactor to initiate the polymerization. The reactor temperature was maintained between 35° C. and 50° C., depending on the target molecular weight. The feed temperature was varied, depending on the polymerization rate to maintain a constant reactor temperature. The polymerization rate was varied from about 0.5 Kg/hr to about 4 Kg/hr.

Hexane at 30 Kg/hr was mixed with ethylene at 717 g/hr and propylene at 5.14 Kg/hr and fed to the reactor. The polymerization catalyst, dimethyl silyl bridged bis-indenyl Hafnium dimethyl activated 1:1 molar ratio with N',N'-Dimethyl anilinium-tetrakis(pentafluorophenyl)borate was introduced at the rate of at 0.0135 g/hr. A dilute solution of tri-isobutyl aluminum was introduced into the reactor as a scavenger of catalyst terminators: a rate of approximately 111 moles of scavenger per mole of catalyst was adequate for this polymerization. After five residence times of steady polymerization, a representative sample of the polymer produced in this polymerization was collected. The solution of the polymer was withdrawn from the top, and then steam distilled to isolate the polymer. The polymerization rate was measured at 3.7 Kg/hr. The polymer produced in this polymerization had an ethylene content of 14 wt %, a Mooney viscosity ML (1+4), 125° C. of 13.1 and had isotactic propylene sequences.

Variations in the composition of the polymer were obtained principally by changing the ratio of ethylene to propylene. Molecular weight of the polymer was varied by either changing the reactor temperature or by changing the ratio of total monomer feed rate to the polymerization rate. Dienes for terpolymerization were added to the mixed feed stream entering the reactor by preparing the diene in a hexane solution and metering it in the required volumetric amount.

EXAMPLE 2

Grafting Maleic Anhydride to the Homopolymer Polypropylene (Comparative)

PP-1 (see Table 1) was grafted on a non-intermeshing counter-rotating twin screw extruder (30 mm, L/D=48) under the following conditions: 97.5 to 98.5 weight % of polymer, 2.5-1.5 weight % of Crystalman™ Maleic Anhydride were fed at 7 kg/h feed rate to the hopper of the extruder and 0.24-0.4 weight % of a 10% solution of Luperox™ 101 dissolved in Marcol™ 52 oil were added to the second barrel. The screw speed was set at 125 rpm and following temperature profile was used: 180° C., 190° C., 190° C., 190° C. with the die at 180° C. Excess reagents as well as peroxide decomposition products were removed with vacuum prior to polymer recovery.

Table 1 describes the polymers that were grafted in the following examples.

TABLE 1

| Backbone | MFR (190° C., 2.16 kg), g/10 min | ML (1 + 4), 125° C. | $C_2$, wt % |
| --- | --- | --- | --- |
| PP-1 | 1.3 | na | 0 |
| ICP-1 | 1 | na | 10.6 |
| PP-E-1 | 2.8 | 12 | 10.6 |
| PP-E-2 | 2.7 | 13 | 15.2 |
| PP-E-3 | 3.3 | 11 | 12.8 |
| PP-E-4 | 1.6 | 20 | 15.3 |
| PP-E-5 | 0.75 | 31 | 11 |

PP-1 is a PP homo-polymer, ICP-1 is an impact copolymer, PP-E-1 to PP-E-5 are typical propylene copolymers from the invention. The grafted polymer characteristics are given in Table 2.

TABLE 2

| Graft # | Backbone | Feeds, % Polymer | Feeds, % MA | Feeds, % L101 | MFR (190° C., 0.352 g) g/10 min | Grafted MA wt % |
| --- | --- | --- | --- | --- | --- | --- |
| 1 | PP-1 | 98.5 | 1.5 | 0.24 | 13 | 0.56 |
| 2 | PP-1 | 97.5 | 2.5 | 0.40 | 25 | 0.75 |

EXAMPLE 3

Grafting Maleic Anhydride to the Impact Copolymer Polypropylene (Comparative)

ICP-1 and ICP-2 were grafted under the same set of conditions as described in example 2. Characteristics of the grafted polymers are given in Table 3.

TABLE 3

| Graft # | Backbone | Feeds, % Polymer | MA | L101 | MFR (190° C., 0.352 g) g/10 min | Grafted MA wt % |
|---|---|---|---|---|---|---|
| 3 | ICP-1 | 98.5 | 1.5 | 0.24 | 1 | 0.53 |
| 4 | ICP-1 | 97.5 | 2.5 | 0.40 | 1.5 | 0.88 |

Compared to PP-1, the ICP-1 gives slightly higher grafting with much lower viscosity reduction.

EXAMPLE 4

Grafting Maleic Anhydride to the Propylene Ethylene Copolymers (Inventive)

PP-E-1 to PP-E-5 polymers from the invention were also functionalized with maleic anhydride according to the procedure described in Example 1. Final functionalized polymers characteristics are described in Table 4.

TABLE 4

| Graft # | Backbone | Feeds, % Polymer | MA | L101 | MFR (190° C., 0.352 g) g/10 min | Grafted MA wt % |
|---|---|---|---|---|---|---|
| 5 | PP-E-1 | 98.5 | 1.5 | 0.24 | 7.2 | 0.64 |
| 6 | PP-E-1 | 97.5 | 2.5 | 0.40 | 8.9 | 0.95 |
| 7 | PP-E-2 | 98.5 | 1.5 | 0.24 | 5 | 0.76 |
| 8 | PP-E-2 | 97.5 | 2.5 | 0.40 | 6.6 | 0.96 |
| 9 | PP-E-3 | 98.5 | 1.5 | 0.24 | 5.8 | 0.96 |
| 10 | PP-E-3 | 97.5 | 2.5 | 0.40 | 9.5 | 1.12 |
| 11 | PP-E-4 | 98.5 | 1.5 | 0.24 | 4.2 | 0.74 |
| 12 | PP-E-4 | 97.5 | 2.5 | 0.40 | 4.1 | 1.22 |
| 13 | PP-E-5 | 98.5 | 1.5 | 0.24 | 5.5 | 0.59 |
| 14 | PP-E-5 | 97.5 | 2.5 | 0.40 | 6.4 | 0.9 |

Versus PP-1, all PP-E examples give a higher grafting with a higher viscosity; when compared to the ICP-1 polymer they tend to give slightly higher grafting with more breakdown. The different behavior (i.e. higher breakdown of the PP-E polymers) most likely results from their different structure; ICP is a hetero-phasic polymer where peroxide is more soluble in the EP phase whereas PP-E are single phase polymers.

Figure 2:
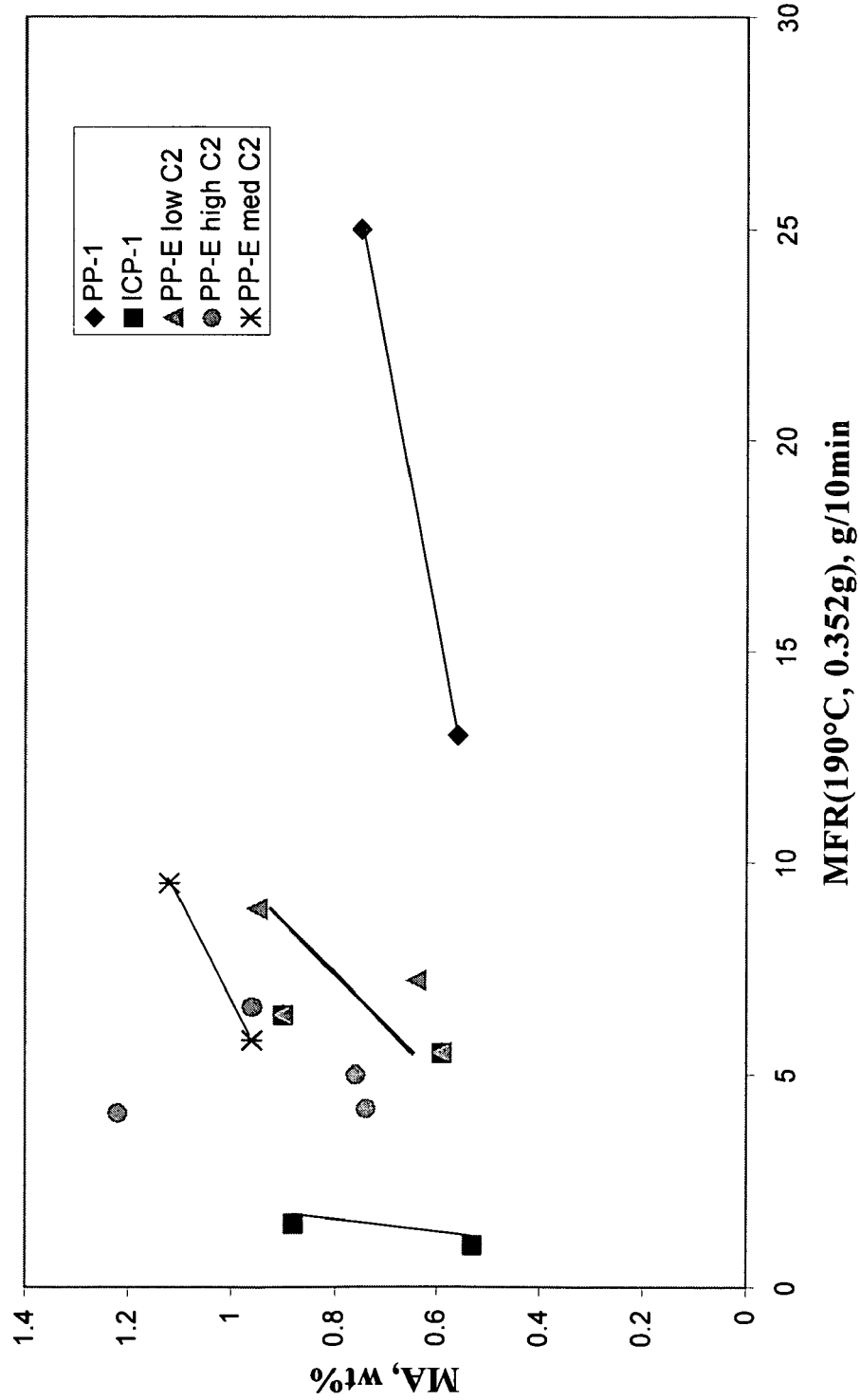
FIG. 2 is a graph illustrating the relationship between increasing amounts of maleic anhydride and the melt flow rate of the present invention.

As illustrated in FIG. 1, the higher the ethylene content in the backbone of the copolymer, the higher the level of grafting. Based on the polypropylene or propylene rich ethylene propylene backbone grafting theory as outlined by W. Heinen et al in *Macromolecules,* 29, 1151,1996, incorporated herein by reference, an increase in the grafting level is generally believed to increase the beta scission and decrease the viscosity of the grafted polymer. However, as illustrated in FIG. 2, the maleation of the novel ethylene/propylene copolymer exhibits increased grafting levels accompanied by minimal viscosity drop penalty (See FIG. 2). FIG. 2 illustrates a much steeper slope in the maleic anhydride/melt flow rate correlation versus a grafted homo-polypropylene polymer, indicating higher grafting levels with minimal loss in viscosity. The present invention enables a maleic anhydride functionalized propylene rich modifier with increased levels of viscosity over known prior art.

EXAMPLE 5

Effect of Adding Peroxide Only to the Copolymer (Inventive)

The following inventive copolymers (Table 5) were subjected to reaction with peroxide under conditions similar to that used for the grafting reaction

TABLE 5

Characterization of propylene-based copolymer samples used for the peroxide degradation

| | $C_2$ wt % | MFR (230° C.) |
|---|---|---|
| PP-E-6 | 11.8 | 12.0 |
| PP-E-7 | 15.7 | 8.9 |

PP-E-6 and PP-E-7 were degraded in a laboratory intensive mixer extruder at 190°-210° C. with Lupersol™ 101, a peroxide available from Pennwalt Corporation. Five different levels of peroxide (nominally 0.4, 0.8, 1.2, 1.6 and 2.0 wt %) were used for each experiment. A control sample with no peroxide added but which had been subjected to the same shear forces in the single screw extruder is used as the comparison in these tables (Tables 6 and 7).

TABLE 6

Characterization data for intensive mixer degraded PP-E-6 copolymer

| Sample | Wt % peroxide | MFR @230° C. | $M_n$ (GPC) × 1000 | $M_w$ (LALLS) × 1000 | $M_z$ (LALLS) × 1000 |
|---|---|---|---|---|---|
| PP-E-6 | 0 | 13.8 | 89.8 | 172.2 | 252.3 |
| PP-E-6 | 0.4 | 364 | 39.6 | 74.4 | 148.3 |
| PP-E-6 | 0.8 | 710 | 30.9 | 60.9 | 105.0 |
| PP-E-6 | 1.2 | 884 | 28.6 | 61.2 | 121.3 |
| PP-E-6 | 1.6 | 1005 | 26.7 | 57.1 | 107.3 |
| PP-E-6 | 2.0 | 1341 | 24.5 | 55.1 | 133.7 |

TABLE 7

Characterization data for intensive mixer degraded PP-E-7 copolymer

| Sample | Wt % peroxide | MFR @230° C. | $M_n$ (GPC) × 1000 | $M_w$ (LALLS) × 1000 | $M_z$ (LALLS) × 1000 |
|---|---|---|---|---|---|
| PP-E-7 | 0 | 8.2 | 94.6 | 167.8 | 241.2 |
| PP-E-7 | 0.4 | 307 | 38.7 | 71.4 | 162.4 |
| PP-E-7 | 0.8 | 665 | 30.7 | 59.4 | 108.8 |
| PP-E-7 | 1.2 | 1062 | 27.5 | 52.9 | 109.8 |
| PP-E-7 | 1.6 | 1110 | 24.9 | 53.7 | 111.9 |
| PP-E-7 | 2.0 | 1331 | 22.9 | 52.0 | 130.8 |

Example 5: Selected inventive polymers of the inventive and comparative examples shown above were tested for the tensile elongation and flexural modulus according to ASTM procedures D790. These results are shown in Table 8.

TABLE 8

Elongation and Flexural Modulus of Inventive Compositions

| Graft # | Backbone | Elongation, % | Flexural modulus, psi · in/in |
|---|---|---|---|
| 2 | PP-1 | 52 | 137000 |
| 3 | ICP-1 | 173 | 112000 |
| 5 | PP-E-1 | 925 | 20000 |
| 6 | PP-E-1 | 870 | 21500 |
| 8 | PP-E-2 | 1132 | 3100 |
| 10 | PP-E-3 | >1200 | 10900 |
| 12 | PP-E-4 | >1200 | 3200 |
| 14 | PP-E-5 | >1200 | 18000 |

These highly functionalized propylene rich polymers may be extremely useful as adhesion promoters between glass fibers and the propylene matrix in applications such as glass fiber polypropylene compounds, as compatibilizers of polyamide-polypropylene blends to increase the percent of elongation at break point, and in glass filled polyamide blends when, in combination with low amounts of polypropylene, may increase the percent of elongation at break point.

While the present invention has been described and illustrated by reference to particular embodiments, it will be appreciated by those of ordinary skill in the art that the invention lends itself to variations not necessarily illustrated herein. Reference should be made solely to the appended claims and their equivalents for purposes of determining the true scope of the present invention.

All documents cited herein are fully incorporated by reference for all jurisdictions in which such incorporation is permitted and to the extent they are not inconsistent with this specification. All documents to which priority is claimed are fully incorporated by reference for all jurisdictions in which such incorporation is permitted. Although dependent claims have single dependencies in accordance with U.S. practice, each of the features in any of the dependent claims can be combined with each of the features of one or more of the other dependent claims dependent upon the same independent claim or claims.

The invention claimed is:

1. An article made from a maleated graft polymer comprising:
   a) a polymer component, said polymer component comprising a random copolymer produced by copolymerizing propylene and a comonomer selected from ethylene or other alpha-olefin having 4 to 6 carbon atoms, said copolymer having a crystallinity of from 0.1 weight % to 50 weight % from isotactic polypropylene sequences, a propylene content of from 68 to 92 mole percent, a comonomer content of from 8 to 32 mole percent and a melting point of said polymer component of from 25° C. to 105° C., wherein the copolymer has a heat of fusion of less than 45 J/g; and
   b) maleic anhydride.

2. The article of claim 1 wherein said comonomer is ethylene.

3. The article of claim 2 wherein said ethylene comonomer content is from 10 to 27 mole percent.

4. The article of claim 1 wherein the graft polymer has an elongation greater than 800%.

5. The article of claim 1 wherein the polymer component has a melting point equal to or less than 75° C.

6. The article of claim 1 wherein the polymer component has a molecular weight distribution of 2.0 to 3.2.

7. The article of claim 1 wherein the polymer component has a melting point by DSC between 30° C. and 60° C.

8. An article made from a composition comprising IPP, glass filler, and the graft polymer of claim 1.

9. Article made from a blend comprising the graft copolymer of claim 1 and i-polypropylene.

10. The article of claim 1 wherein the graft polymer is a single phase graft polymer.

11. An article made from a blend comprising the graft copolymer of claim 1 and an ethylene propylene copolymer.

12. An article made from a graft polymer composition produced by grafting:
   a) a polymer component, said polymer component comprising a random copolymer produced by copolymerizing propylene and a comonomer selected from ethylene or other alpha-olefin having 4 to 6 carbon atoms, said copolymer having a crystallinity of from 0.1 weight % to 50 weight % from isotactic polypropylene sequences, a propylene content of from 68 to 92 mole %, a comonomer content of from 8 to 32 mole percent and a melting point of said polymer component of from 25° C. to 105° C.;
   b) maleic anhydride; and
   c) an initiator.

13. The article of claim 12 wherein said comonomer is ethylene.

14. The article of claim 13 wherein said ethylene comonomer content is from 10 to 27 mole percent.

15. The article of claim 12 wherein the maleic anhydride content is at least 0.5 weight percent.

16. The article of claim 12 wherein the initiator is peroxide.

* * * * *